US009405077B2

(12) United States Patent
Luo et al.

(10) Patent No.: US 9,405,077 B2
(45) Date of Patent: Aug. 2, 2016

(54) OPTICAL CONNECTOR

(71) Applicant: Intel Corporation, Santa Clara, CA (US)

(72) Inventors: Xiaobing Luo, San Jose, CA (US); Zining Huang, Fremont, CA (US); Qing Tan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 14/527,586

(22) Filed: Oct. 29, 2014

(65) Prior Publication Data

US 2016/0124165 A1 May 5, 2016

(51) Int. Cl.
*G02B 6/36* (2006.01)
*G02B 6/38* (2006.01)
*G02B 6/42* (2006.01)

(52) U.S. Cl.
CPC ............ *G02B 6/3833* (2013.01); *G02B 6/3854* (2013.01); *G02B 6/3855* (2013.01); *G02B 6/3861* (2013.01); *G02B 6/4207* (2013.01); *G02B 6/4228* (2013.01); *G02B 6/4239* (2013.01)

(58) Field of Classification Search
CPC .. G02B 6/3833; G02B 6/3854; G02B 6/3855; G02B 6/3861
USPC ................................................. 385/78, 80, 92
See application file for complete search history.

(56) References Cited

U.S. PATENT DOCUMENTS

| | | | | |
|---|---|---|---|---|
| 6,978,073 B2 * | 12/2005 | Yamamoto | ........... | G02B 6/3644 385/137 |
| 8,529,138 B2 * | 9/2013 | Duis | ..................... | G02B 6/3826 385/137 |
| 9,103,993 B2 * | 8/2015 | Kuo | ...................... | G02B 6/3672 |
| 9,176,283 B2 * | 11/2015 | Kuo | ...................... | G02B 6/3636 |
| 2011/0262079 A1 * | 10/2011 | Kato | .................... | B29C 45/0025 385/78 |
| 2012/0224809 A1 * | 9/2012 | Ootorii | ..................... | G02B 6/32 385/33 |
| 2012/0328245 A1 * | 12/2012 | Lin | ...................... | G02B 6/3853 385/77 |
| 2013/0163936 A1 * | 6/2013 | Ohta | ..................... | G02B 6/3861 385/80 |
| 2014/0105543 A1 * | 4/2014 | de Jong | ................. | G02B 6/3853 385/77 |
| 2015/0043869 A1 * | 2/2015 | Kuo | ...................... | G02B 6/3833 385/53 |

FOREIGN PATENT DOCUMENTS

| | | | | |
|---|---|---|---|---|
| JP | 7-72349 | * | 3/1995 | ............... G02B 6/36 |
| JP | WO 2014/168187 A1 | * | 10/2014 | ............... G02B 6/36 |

* cited by examiner

*Primary Examiner* — Robert Tavlykaev
(74) *Attorney, Agent, or Firm* — Schwabe, Williamson & Wyatt, P.C.

(57) ABSTRACT

Embodiments of the present disclosure are directed toward techniques and configurations for an apparatus with an optical connector. In one embodiment, the apparatus may include an optical connector having a cage to receive an optical fiber cable to connect the apparatus with another apparatus. The cage may include first and second sides and a face that mates the first and second sides. The face may comprise an optical interface to optically connect tips of the optical fiber cable and the other apparatus. The cage may further include a cavity having a first portion formed substantially in the face to receive the optical interface, and a second portion that extends into one of the first or second sides to provide an opening to enable application of an adhesive material to the tips of the cable, to fixably connect the tips with the optical interface. Other embodiments may be described and/or claimed.

20 Claims, 6 Drawing Sheets

OPTICAL CONNECTOR

FIELD

Embodiments of the present disclosure generally relate to the field of optoelectronics, and more particularly, to configurations for optical connectors for photonic devices.

BACKGROUND

Photonic devices used in computing systems convey information in a form of optical signals by sending the signals over optical fiber cables. It is desirable to have optical connectors that may couple photonic devices with optical fiber cables with sufficiently high return loss of power in reflected optical signal, to avoid or reduce loss of power in transmitted optical signal. Typically, such connectors may be made of transparent materials, such as transparent thermoplastic. It may be desirable to apply anti-reflective coating to transparent optical connectors in order to provide a desired return loss. However, such optical connectors may be too expensive and complex to manufacture, for example, using traditional injection molding process. Further, applying anti-reflective coating to a thermoplastic material may prove difficult and the resulting coating may be unreliable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
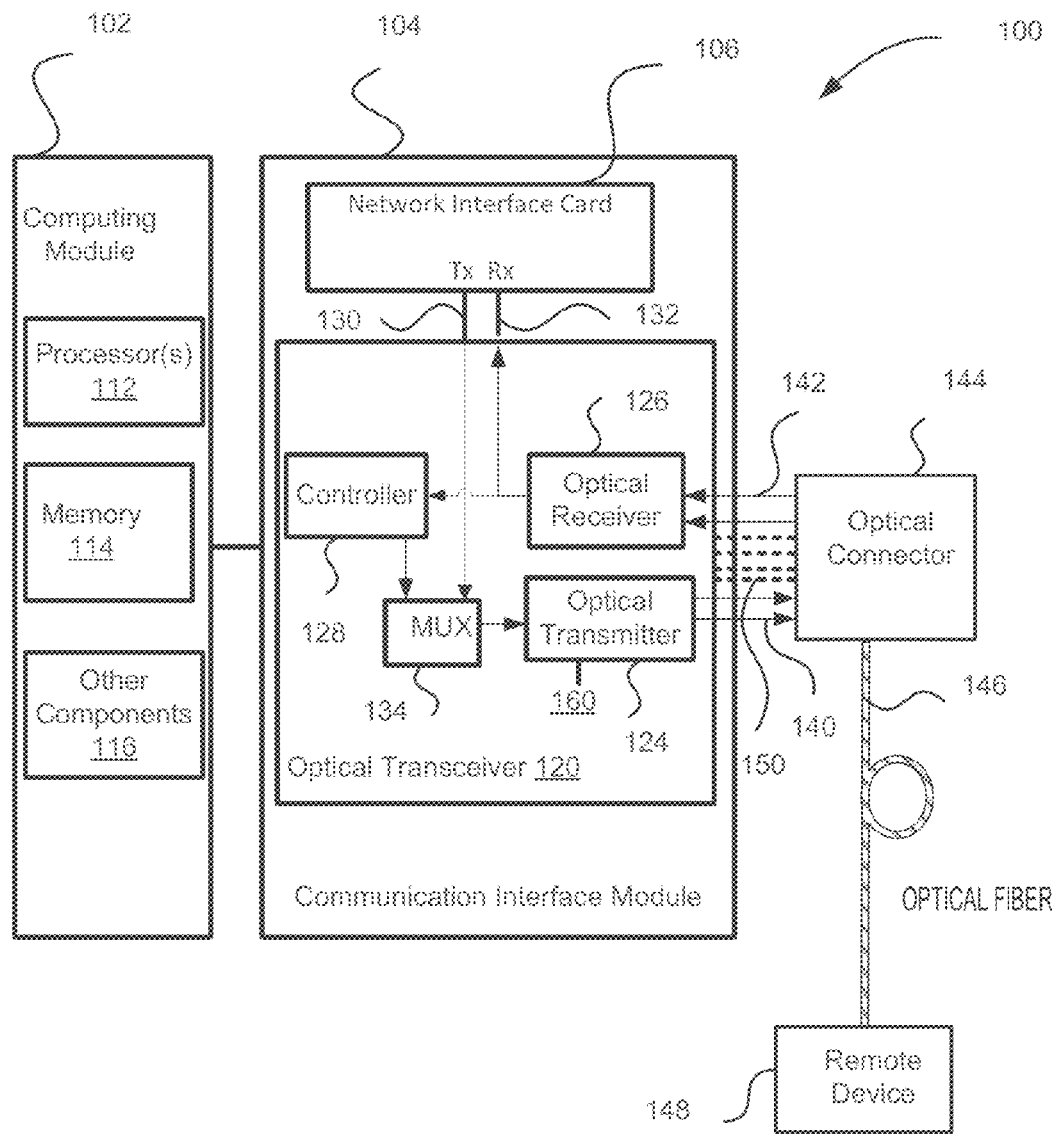
FIG. 1 is a block diagram of a computing device that may include an optical connector fabricated using techniques described herein, in accordance with some embodiments.

Embodiments of the present disclosure describe techniques and configurations for an apparatus with an optical connector configured to provide a desired return loss of optical signal power. In some embodiments, the optical connector may include a cage to receive an optical fiber cable for connection of the apparatus with another apparatus, having first and second sides and a face that mates the first and second sides. The face may comprise an optical interface to enable optical connection between tips of the optical fiber cable and the other apparatus. The cage may include a cavity having a first portion formed substantially in the face to receive the optical interface, and a second portion extending into one of the first or second sides to provide an opening to enable application of an adhesive material to the tips of the optical fiber cable, to fixably connect the tips with the optical interface.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of a computing device 100 that may include an optical connector fabricated using techniques described herein, in accordance with some embodiments. The computing device 100 may be used to transmit and receive an optical signal over an optical fiber having the optical connector, for example, between racks in a data center, between computing devices, between a sled in a tray of a rack and another device, or between data storage facilities, data centers, and the like.

As illustrated, the computing device 100 may include a computing module 102 having a processor 112, a memory 114, and other components 116 configured to provide desired computing and other functionalities for the computing device 100, coupled with each other. The computing device 100 may further include a communication interface module 104 configured to provide communication, e.g., network connectivity for the computing device 100.

In some embodiments, the processor 112 and/or memory 114 of the computing device 100 may be configured to generate and/or process data provided to a network (not shown) or from the network via the communication interface module 104. It should be appreciated that, in some embodiments, any or all of the illustrated components, such as the communication interface module 104, may be separate from and remote to, but communicatively coupled with, the computing device 100 (e.g., with computing module 102, as shown). In some embodiments, one or more of the illustrative components may be incorporated in or otherwise be a portion of another component. For example, the memory 114, or portions thereof, may be incorporated in the processor 112 in some embodiments. An example configuration of the computing device 100 is described in more detail in reference to FIG. 8.

In embodiments, the communication interface module 104 may include a network interface card (NIC) 106 (e.g., optical NIC) configured to connect the computing device 100 to a computer network. The NIC 106 may be associated with (e.g., connected with via one or more transmission and reception connections 130 and 132) an optical module such as optical transceiver 120. In some embodiments, the optical transceiver 120 may be a part of the NIC 106.

The optical transceiver 120 may include a transmitter 124 having a light source (e.g., laser) 160 and an optical receiver 126 to connect with a network and/or another computing device, such as remote device 148 comprising an optical apparatus, over one or more optical communication channels 150 (shown in dashed lines). Each communication channel 150 may comprise a transmission link 140 and a reception link 142. The communication channel 150 comprising the transmission and reception links 140 and 142 may be implemented via an optical fiber cable 146 connected with the communication interface module 104 with an optical connector 144, configured as described in greater detail in reference to FIGS. 2-6.

The data to be transmitted may be provided by the computing module 102 to the communication interface module 104. For example, the data signal may be provided, via Tx connection 130 connecting the NIC 106 to a multiplexer (MUX) 134. At MUX 134, a signal multiplexed from connection 130 may be input to the optical transmitter 124, to be transmitted as an optical signal to the remote device 148 via the transmission link 140 over the optical fiber cable 146 with the optical connector 144. The data to be received by device 100 may be provided via the cable 146 with the optical connector 144 to the optical receiver 126 and to the NIC 106 via Rx connection 132.

The optical transceiver 120 may further include a controller 128 (e.g., microcontroller) to control the operation of the transmitter 124 and receiver 126, among other functions.

Figure 2:
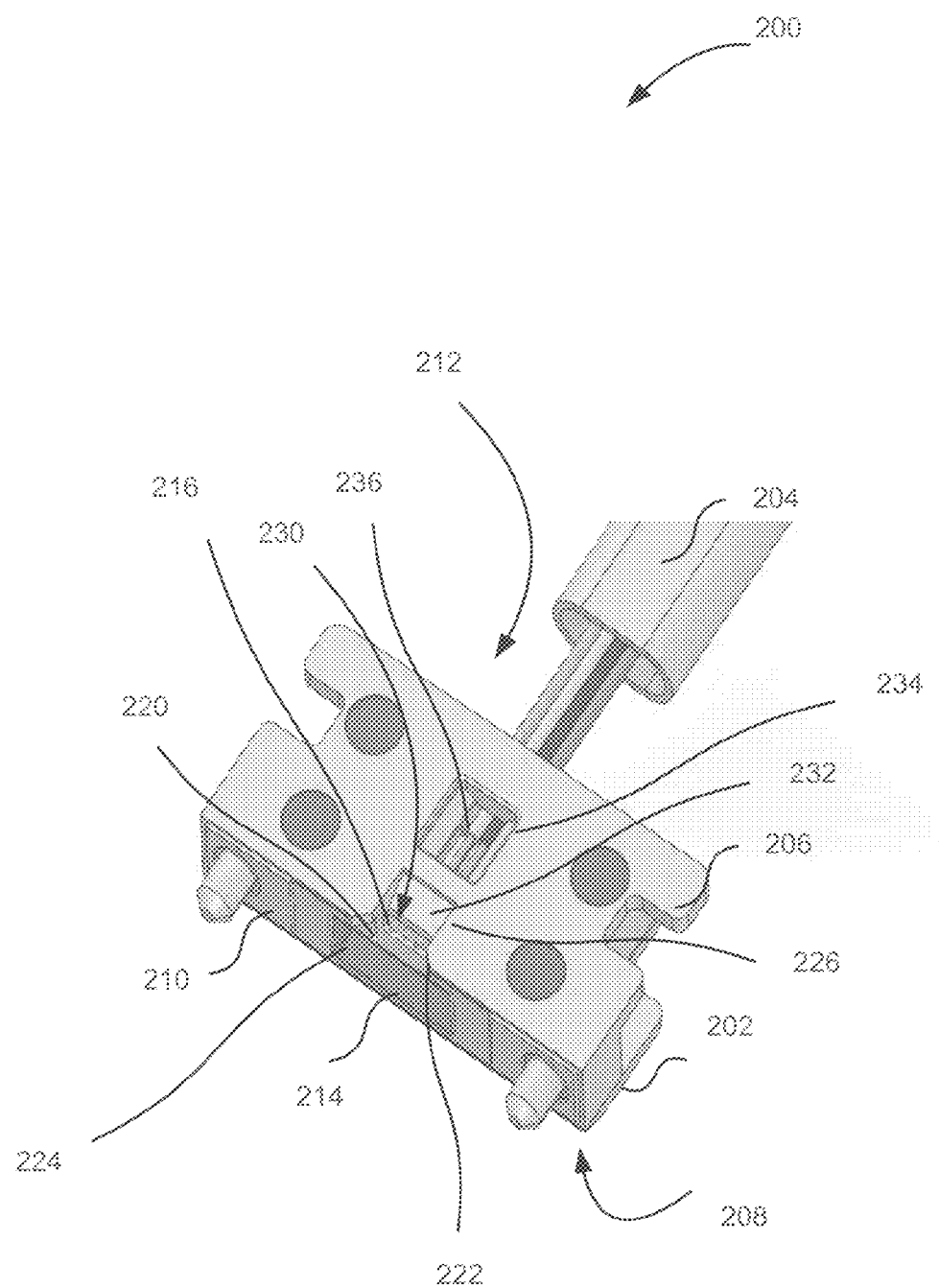
FIG. 2 illustrates a three-dimensional view of an optical connector similar to the optical connector described in reference to FIG. 1, in accordance with some embodiments.

FIG. 2 illustrates a three-dimensional view of an optical connector 200 similar to the optical connector 144 described in reference to FIG. 1, in accordance with some embodiments. The optical connector 200 may include a cage (e.g., receptor) 202 to receive an optical fiber cable 204 that may provide the optical connection between an apparatus (e.g., computing device 100) and another apparatus (e.g., remote device 148 of FIG. 1). The cage 202 may be fabricated (e.g., molded) from a substantially transparent material, such as thermoplastic, for example.

As shown, the cage 202 may include a first (top) side 206 and second (bottom) side 208 (not visible in FIG. 2) and a face 210 that mates the first and second sides 206 and 208. The cage 202 may further include a back with an aperture 212 (not visible in FIG. 2) for receiving an optical fiber cable 204. As shown, the face 210 may be disposed substantially perpendicular to the first and second sides 206, 208.

The face 210 may include an optical interface 214 to enable optical connection between tips 216 of the optical fiber cable 204 and the other apparatus (e.g., 148). To ensure this optical connection, the optical fiber cable 204 may be inserted into the cage 202 such that the tips 216 may come in direct contact with the optical interface 214. In some embodiments, the optical interface 214 may comprise a transparent (e.g., glass or another optical functional component, such as isolator etc) window of a desired thickness (indicated by numeral 220). The optical interface 214 may be covered (e.g., on its external side) with an antireflection coating material. The tips 216 may be provided by cleaving ribbon portions 236 of the optical fiber cable 204, to ensure substantially flat end faces of the ribbon portions, in a substantially perpendicular direction to the longitudinal axis of the optical fiber cable 204.

The cage 202 may be fabricated to enable insertion of the optical interface 214 into the face 210. For example, the cage 202 may include a cavity 222 having a first portion 224 formed substantially in the face 210 to receive the optical interface 214, and a second portion 226 extending into the first side 206 to provide an opening 230 to enable application of an adhesive material to the tips 216 of the optical fiber cable 204, to fixably connect the tips 216 with the optical interface 214. The adhesive material may comprise epoxy, for example. The opening 230 may comprise a recess 232 to facilitate the application of the adhesive material to the tips 216 of the optical fiber cable 204, in order to fixably attach the tips 216 to the optical interface 214.

Providing the cavity 222 as a combination of portions 224 and 226 including the opening 230 as described above may enhance manufacturability of the opening 230 and simplify the fabrication of the cage 202. As provided by FIG. 2 and above description, the dimensions of opening 230 may be defined by thickness 220 of the optical interface 214 and the dimensions of the recess 232. Accordingly, the opening 230 may have a desired size (e.g., smaller than the currently fabricated apertures and sufficient for the application of the adhesive material). When the tips 216 are immersed in the adhesive material provided through the opening 230, desired precision of an interface between the tips 216 and the optical interface 214 may be achieved.

In embodiments, the first side 206 may include another opening 234 to enable application of the adhesive material to the ribbon portions 236 of the optical fiber cable 204 to fixably attach the optical fiber cable 214 (e.g., the ribbon portions 236) to the cage 202.

FIGS. 3-6 illustrate the process of fabrication and assembly of the optical connector 200, in accordance with some embodiments.

Figure 3:
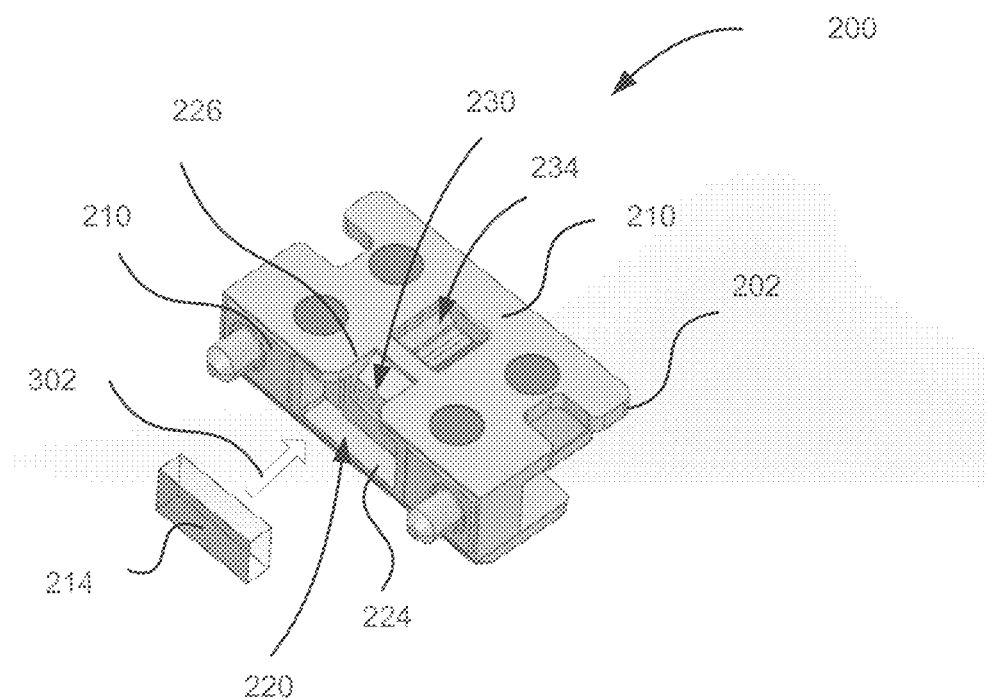
FIGS. 3-6 illustrate the process of fabrication and assembly of the optical connector 200, in accordance with some embodiments.
Figure 4:
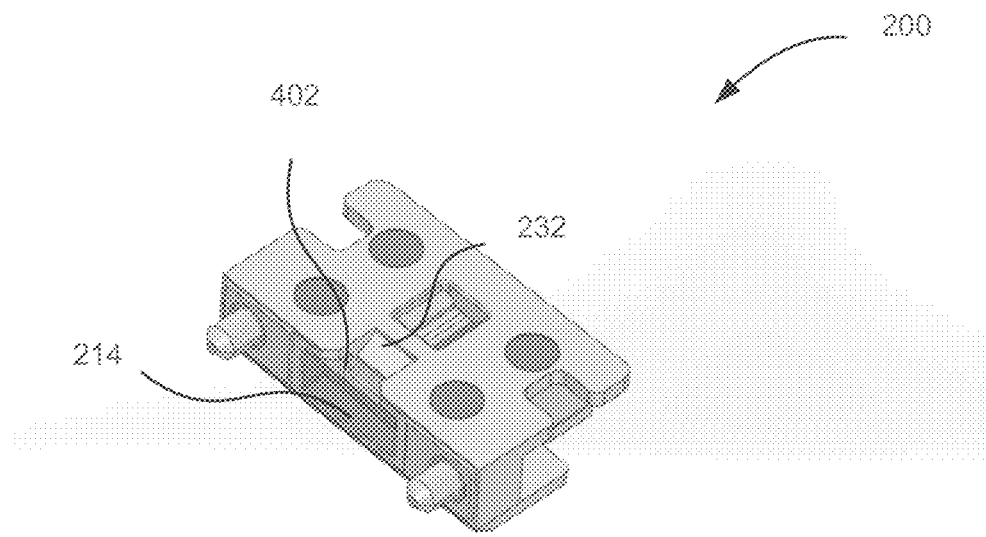
Figure 5:
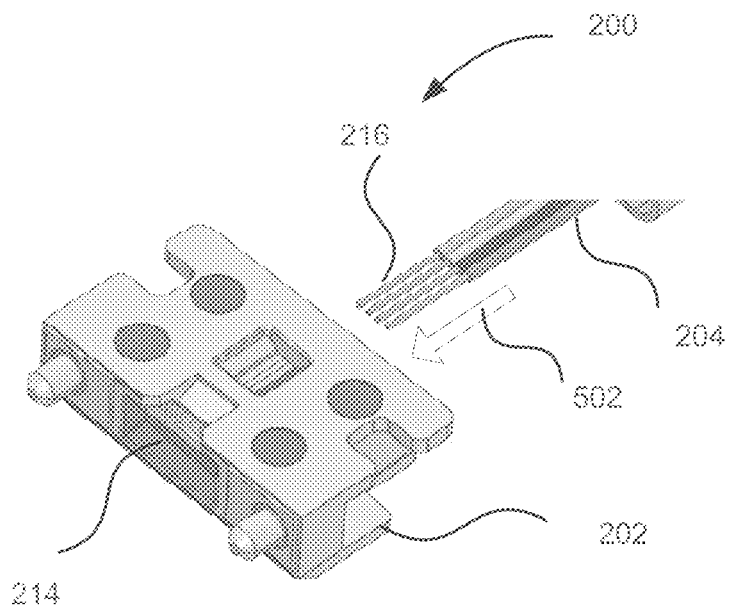

FIG. 3 illustrates the optical connector 200 subsequent to molding of the cage 202. As shown, the cavity 222 is formed in the cage 202 as described in reference to FIG. 2. More specifically, the cavity 222 comprises the first portion 224 formed substantially in the face 210 to receive the optical interface 214 that may be insertable into the first portion 224 as indicated by arrow 302. The cavity 222 further comprises the second portion 226 extending into the first side 206 of the cage 202 to provide an opening 230 after actions illustrated by FIGS. 4 and 5 are completed. The cage 202 may further comprise the opening 234, as discussed in reference to FIG. 2.

FIG. 4 illustrates the optical connector 200 subsequent to insertion of the optical interface 214 into the cage 202. As shown, the optical interface 214 (e.g., glass mirror with anti-reflective coating) may be inserted into the first portion 224 of the cavity 222, forming the opening 230 between an inner side 402 of the mirror and the recess 232.

FIG. 5 illustrates the optical connector 200 prior to insertion of the cable 204 into the cage 202. As discussed, the optical fiber cable 204 may be inserted into the cage 202 (as indicated by arrow 502) such that the tips 216 may come in direct contact and be placed substantially perpendicularly to the inner side of the optical interface 214.

Figure 6:
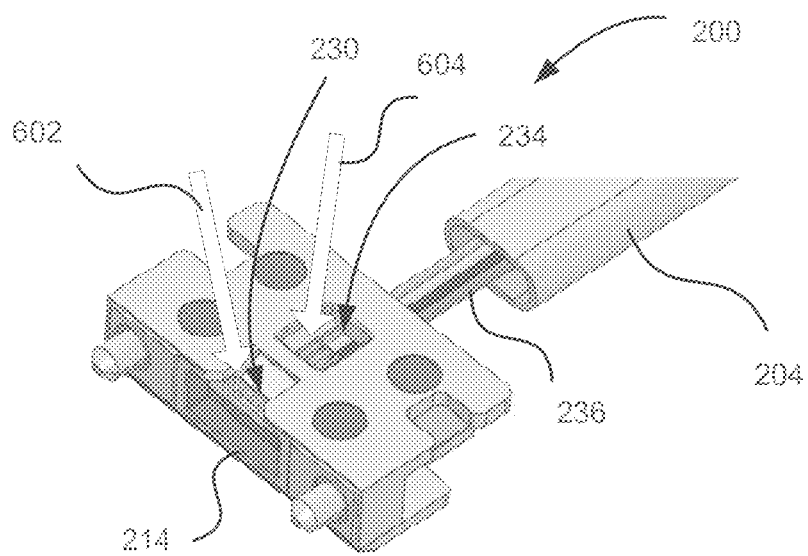

FIG. 6 illustrates the optical connector 200 subsequent to the insertion of the optical fiber cable 204 into the cage 202. As illustrated by arrow 602, an adhesive material may be applied into the opening 230 of the second portion 226 of the cavity 222 to fixably connect the tips 216 with the optical interface 214. As illustrated by arrow 602, an adhesive material may be applied into the opening 234 of the cage 202 to fixably connect the ribbon portions 236 of optical fiber cable 204 with the cage 202.

Figure 7:
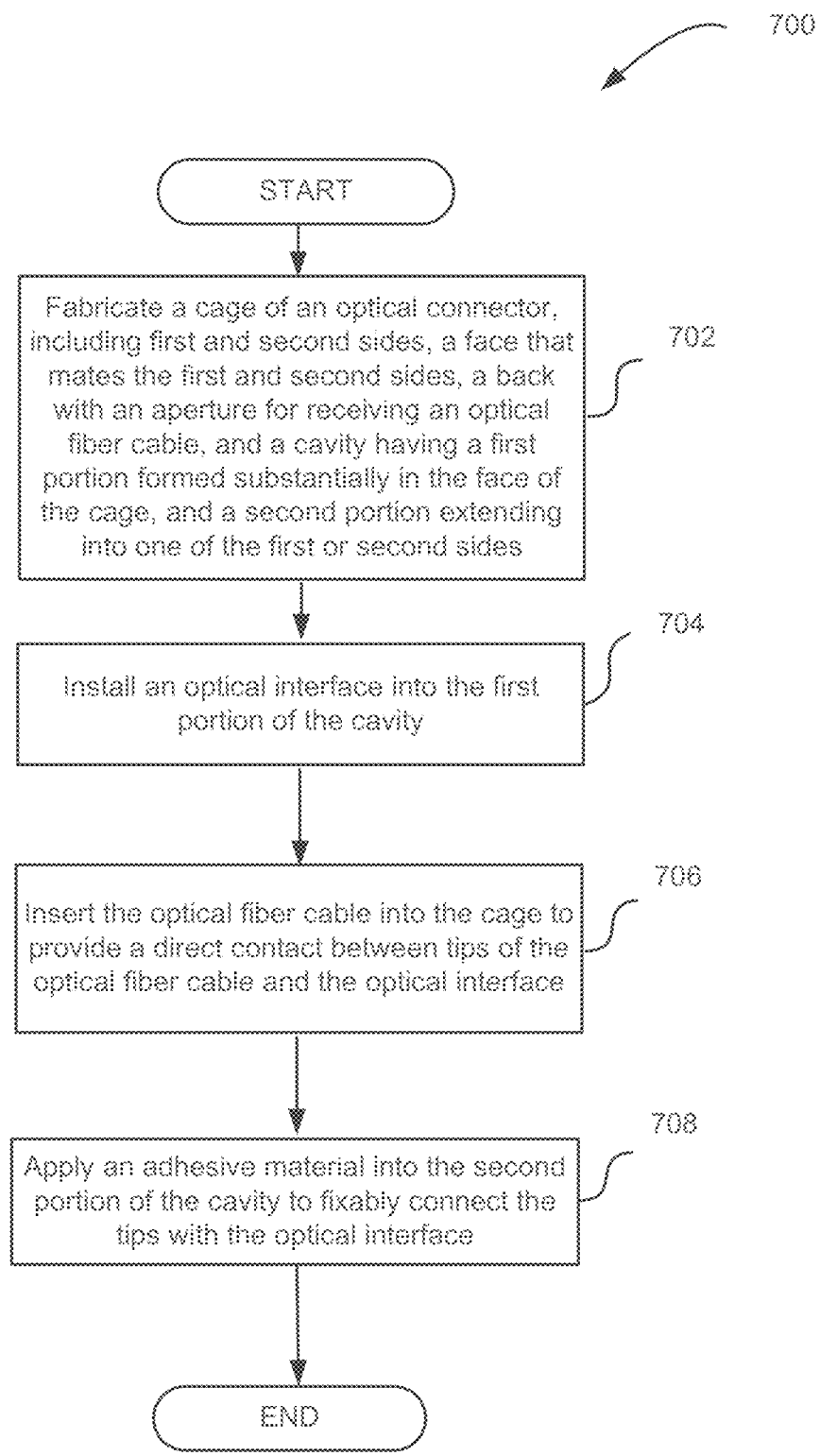
FIG. 7 schematically illustrates a process flow diagram for fabricating the optical connector as described in reference to FIGS. 1-6, in accordance with some embodiments.

FIG. 7 illustrates a process flow diagram 700 of fabricating the optical connector as described in reference to FIGS. 2-6, in accordance with some embodiments. Various operations are described in reference to the process 700 as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

At block 702, the process 700 may include fabricating a cage of an optical connector, including first and second sides, a face that mates the first and second sides, and a back with an aperture for receiving an optical fiber cable, as described in reference to FIG. 3. Fabricating may include forming a cavity in the cage, having a first portion formed substantially in the face of the cage, and a second portion extending into one of the first or second sides. Fabricating the cage may include molding the cage from a substantially transparent material, such as thermoplastic. Forming a cavity in the cage may include forming a recess for application of adhesive material in the second portion of the cavity.

At block 704, the process 700 may include installing an optical interface into the first portion of the cavity, as described in reference to FIG. 4. Installing the optical interface into the first portion of the cavity may include inserting a glass window that forms the interface into the first portion of the cavity.

At block 706, the process 700 may include inserting the optical fiber cable into the cage to provide a direct contact between tips of the optical fiber cable and the optical interface.

At block 708, the process 700 may include applying an adhesive material into the second portion of the cavity to fixably connect the tips with the optical interface. Applying an adhesive material into the second portion of the cavity includes pouring epoxy into the cavity.

Figure 8:
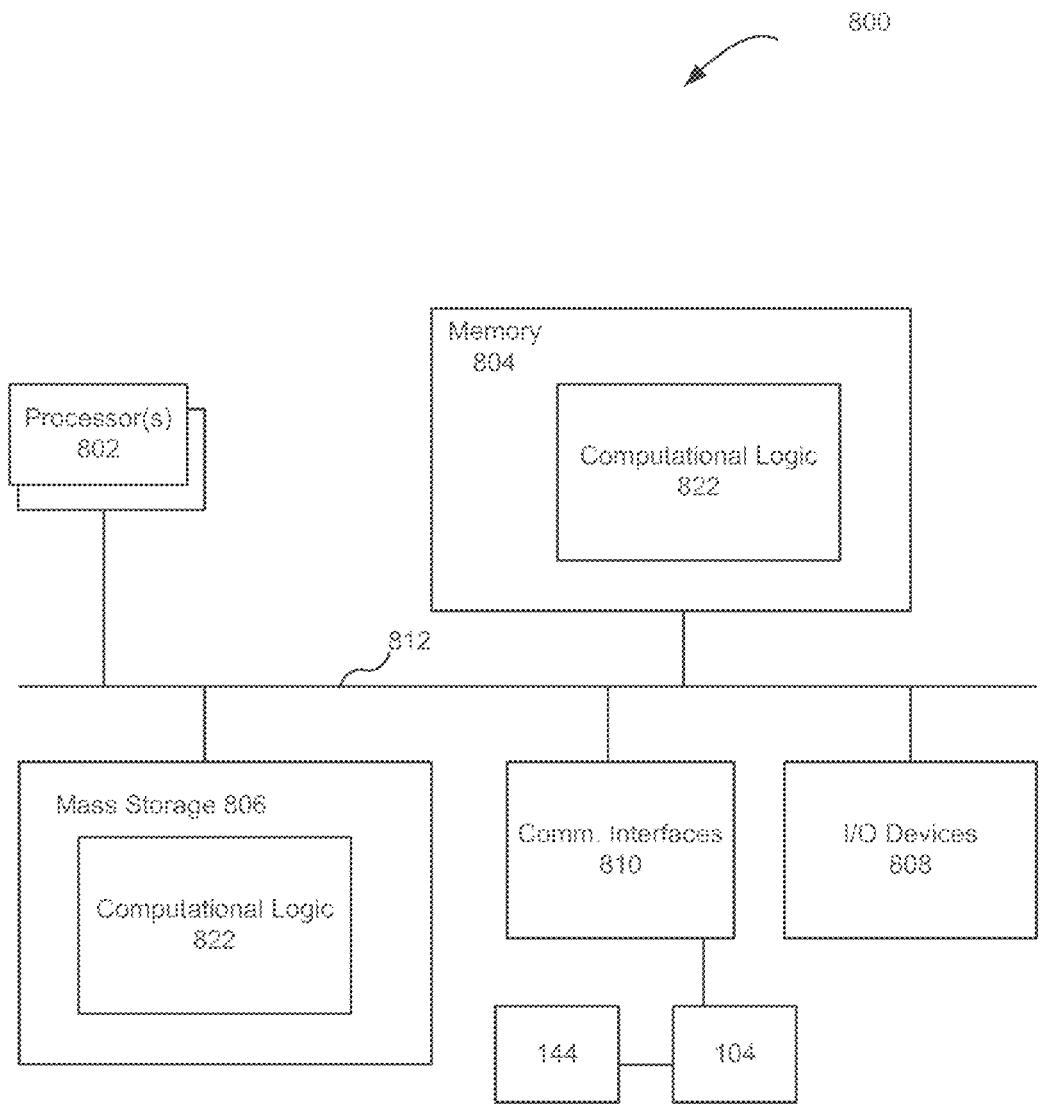
FIG. 8 schematically illustrates an example computing device including at least some of the components of the optical connector of FIGS. 1-6, in accordance with some embodiments.

FIG. 8 illustrates an example computing device 800 suitable for use with various components of FIG. 1, such as computing device 100 including communication interface module 104 and optical connector 144 of FIG. 1. As described above, the optical connector 144 may comprise optical connector 200 of FIGS. 2-6, in accordance with various embodiments. As shown, computing device 800 may include one or more processors or processor cores 802 and system memory 804. For the purpose of this application, including the claims, the terms "processor" and "processor cores" may be considered synonymous, unless the context clearly requires otherwise. The processor 802 may include any type of processors, such as a central processing unit (CPU), a microprocessor, and the like. The processor 802 may be implemented as an integrated circuit having multi-cores, e.g., a multi-core microprocessor.

The computing device 800 may include mass storage devices 806 (such as diskette, hard drive, volatile memory (e.g., dynamic random-access memory (DRAM), compact disc read-only memory (CD-ROM), digital versatile disk (DVD), and so forth)). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 800 may further include input/output (I/O) devices 808 (such as a display (e.g., a touchscreen display), keyboard, cursor control, remote control, gaming controller, image capture device, and so forth) and communication interfaces 810 (such as network interface cards, optical apparatuses, modems, infrared receivers, radio receivers (e.g., Bluetooth), and so forth).

In some embodiments, the communication interfaces 810 may include some or all of the components of the communication interface module 104 and components connecting device 800 with other devices or networks, such as optical connector 144. The connector 144 may include components configured similarly to the optical connector 200 of FIGS. 2-6. For example, the optical connector 144 may include cage 202 with cavity 222 and optical interface 214 configured as described in reference to FIGS. 2-6.

The communication interfaces 810 may include communication chips (not shown) that may be configured to operate the device 800 in accordance with known wireless protocols.

The above-described computing device 800 elements may be coupled to each other via system bus 812, which may represent one or more buses. In the case of multiple buses, they may be bridged by one or more bus bridges (not shown). Each of these elements may perform its conventional functions known in the art. The various elements may be implemented by assembler instructions supported by processor(s) 802 or high-level languages that may be compiled into such instructions.

The number, capability, and/or capacity of the elements 808, 810, 812 may vary, depending on whether computing device 800 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 804 and mass storage 806 may include temporal and persistent copies of computational logic 822 of computing device 800, such as its operating system, one or more applications and so forth. In various implementations, the computing device 800 may comprise one or more components of a data center, such as a server, a switch, a gateway, a router, and so forth. In other embodiments, computing device 800 may be a laptop, a netbook, a notebook, an ultrabook, a smartphone, a tablet, a personal digital assistant (PDA), an ultra mobile PC, a mobile phone, or a digital camera. In further implementations, the computing device 800 may be any other electronic device that processes data.

According to various embodiments, the present disclosure describes a number of examples. Example 1 is an optical apparatus for optical connection comprising: an optical connector having a cage to receive an optical fiber cable to connect the apparatus with another apparatus, wherein the cage includes first and second sides and a face that mates the first and second sides, wherein the face comprises an optical interface to optically connect tips of the optical fiber cable and the other apparatus, wherein the cage further includes a cavity having a first portion formed substantially in the face to receive the optical interface, and a second portion that extends into one of the first or second sides to provide an opening to enable application of an adhesive material to the tips of the optical fiber cable, to fixably connect the tips with the optical interface.

Example 2 may include the subject matter of Example 1, and further specifies that the cage comprises a substantially transparent material.

Example 3 may include the subject matter of Example 1, and further specifies that the optical interface comprises a glass window or another optical functional component.

Example 4 may include the subject matter of Example 3, and further specifies that the glass window is covered with an antireflection coating material.

Example 5 may include the subject matter of Example 1, and further specifies that the face is disposed substantially perpendicular to the first and second sides.

Example 6 may include the subject matter of Example 1, and further specifies that the opening comprises a recess to facilitate the application of the adhesive material to the tips of the optical fiber cable.

Example 7 may include the subject matter of Example 1, and further specifies that he adhesive material comprises epoxy.

Example 8 may include the subject matter of Example 1, and further specifies that the apparatus is a computing device, further comprising one or more processors.

Example 9 may include the subject matter of Example 1, and further specifies that the one of the first or second sides includes another opening to enable application of the adhesive material to the optical fiber cable to fixably attach the optical fiber cable to the cage.

Example 10 may include the subject matter of Examples 1 to 9, and further specifies that the other apparatus comprises a computing device or an optical module associated with a computing device.

Example 11 may include the subject matter of Example 10, and further specifies that the computing device or the optical module is disposed on a selected one of a rack, tray or sled.

Example 12 is an apparatus for an optical connection, comprising: a computing device; and an optical assembly to connect the computing device with another apparatus, the optical assembly comprising: an optical connector having a cage to receive an optical fiber cable to connect the apparatus with the other apparatus, wherein the cage includes first and second sides and a face that mates the first and second sides, wherein the face comprises an optical interface to optically connect tips of the optical fiber cable and the other apparatus, wherein the cage further includes a cavity having a first portion formed substantially in the face to receive the optical interface, and a second portion that extends into one of the first or second sides to provide an opening to enable application of an adhesive material to the tips of the optical fiber cable, to fixably connect the tips with the optical interface.

Example 13 may include the subject matter of Example 12, and further specifies that the cage comprises a substantially transparent material, wherein the optical interface comprises a glass window covered with an antireflection coating material.

Example 14 may include the subject matter of Example 12, and further specifies that the opening comprises a recess to facilitate the application of the adhesive material to the tips of the optical fiber cable.

Example 15 may include the subject matter of Examples 12 to 14, and further specifies that the apparatus is one of: a computing device or an optical module, wherein the computing device or the optical module is disposed on a selected one of a rack, a tray, or a sled of a tray.

Example 16 is a method for making an optical connector, comprising: fabricating a cage of an optical connector, including first and second sides, a face that mates the first and second sides, and a back with an aperture for receiving an optical fiber cable, wherein fabricating includes forming a cavity in the cage, the cavity having a first portion formed substantially in the face of the cage, and a second portion extending into one of the first or second sides; installing an optical interface into the first portion of the cavity; inserting the optical fiber cable into the cage to provide a direct contact between tips of the optical fiber cable and the optical interface; and applying an adhesive material into the second portion of the cavity to fixably connect the tips with the optical interface.

Example 17 may include the subject matter of Example 16, and further specifies that fabricating includes molding the cage from a substantially transparent material.

Example 18 may include the subject matter of Example 16, and further specifies that installing an optical interface into the first portion of the cavity includes inserting a glass window into the first portion of the cavity.

Example 19 may include the subject matter of Examples 16 to 18, and further specifies that wherein forming a cavity in the cage includes forming a recess for application of adhesive material in the second portion of the cavity.

Example 20 may include the subject matter of Example 19, and further specifies that applying an adhesive material into the second portion of the cavity includes pouring epoxy into the cavity.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus comprising:
an optical connector having a cage to receive an optical fiber cable to connect the apparatus with another apparatus, wherein the cage includes first and second sides and a face that mates the first and second sides, wherein the face includes an optical interface inserted into the face to optically connect tips of the optical fiber cable and the other apparatus,
wherein the cage further includes a cavity having a first portion formed substantially in the face to receive the optical interface, and a second portion that comprises a continuous extension of the first portion into one of the first or second sides to provide an opening formed as a recess to enable application of an adhesive material to the tips of the optical fiber cable, to fixably connect the tips with the optical interface, and to provide direct contact between the tips and the optical interface, wherein the recess comprises a substantially flat first surface that directly extends from a plane of the one of the first or second sides toward the first portion and is disposed at an oblique angle to the one of the first or second sides, and directly connects with a substantially flat second surface that is disposed at a substantially normal angle to the one of the first or second sides.

2. The apparatus of claim 1, wherein the cage comprises a substantially transparent material.

3. The apparatus of claim 1, wherein the optical interface comprises a glass window or another optical functional component.

4. The apparatus of claim 3, wherein the glass window is covered with an antireflection coating material.

5. The apparatus of claim 1, wherein the face is disposed substantially perpendicular to the first and second sides.

6. The apparatus of claim 1, wherein the recess is to facilitate the application of the adhesive material to the tips of the optical fiber cable.

7. The apparatus of claim 1, wherein the adhesive material comprises epoxy.

8. The apparatus of claim 1, wherein the apparatus is a computing device, further comprising one or more processors.

9. The apparatus of claim 1, wherein the one of the first or second sides includes another opening to enable application of the adhesive material to the optical fiber cable to fixably attach the optical fiber cable to the cage.

10. The apparatus of claim 1, wherein the other apparatus comprises a computing device or an optical module associated with a computing device.

11. The apparatus of claim 10, wherein the computing device or the optical module is disposed on a selected one of a rack, tray or sled.

12. An apparatus, comprising:
a computing device; and
an optical assembly to connect the computing device with another apparatus, the optical assembly comprising:
an optical connector having a cage to receive an optical fiber cable to connect the apparatus with the other apparatus, wherein the cage includes first and second sides and a face that mates the first and second sides, wherein the face includes an optical interface inserted into the face to optically connect tips of the optical fiber cable and the other apparatus,
wherein the cage further includes a cavity having a first portion formed substantially in the face to receive the optical interface, and a second portion that comprises a continuous extension of the first portion into one of the first or second sides to provide an opening formed as a recess to enable application of an adhesive material to the tips of the optical fiber cable, to fixably connect the tips with the optical interface, and to provide direct contact between the tips and the optical interface, wherein the recess comprises a substantially flat first surface that directly extends from a plane of the one of the first or second sides toward the first portion and is disposed at an oblique angle to the one of the first or second sides, and directly connects with a substantially flat second surface that is disposed at a substantially normal angle to the one of the first or second sides.

13. The apparatus of claim 12, wherein the cage comprises a substantially transparent material, wherein the optical interface comprises a glass window covered with an antireflection coating material.

14. The apparatus of claim 12, wherein the recess is to facilitate the application of the adhesive material to the tips of the optical fiber cable along the first surface of the second portion.

15. The apparatus of claim 12, wherein the apparatus is one of: a computing device or an optical module, wherein the computing device or the optical module is disposed on a selected one of a rack, a tray, or a sled of a tray.

16. A method, comprising:
fabricating a cage of an optical connector, including first and second sides, a face that mates the first and second sides, and a back with an aperture for receiving an optical fiber cable, wherein fabricating includes forming a cavity in the cage, the cavity having a first portion formed substantially in the face of the cage, and a second portion that comprises a continuous extension of the first portion into one of the first or second sides to provide an opening formed as a recess to enable application of an adhesive material to tips of the optical fiber cable, to fixably connect the tips with an optical interface, and to provide direct contact between the tips of the optical fiber cable and the optical interface,
wherein forming the recess further includes providing a substantially flat first surface directly extending from a plane of the one of the first or second sides toward the first portion and disposed at an oblique angle to the one of the first or second sides, and directly connecting the first surface with a substantially flat second surface, wherein directly connecting includes providing the second surface at a substantially normal angle to the one of the first or second sides to abut the first surface;
installing the optical interface into the first portion of the cavity;
inserting the optical fiber cable into the cage to provide the direct contact between the tips of the optical fiber cable and the optical interface; and
applying the adhesive material into the second portion of the cavity to fixably connect the tips with the optical interface.

17. The method of claim 16, wherein fabricating includes molding the cage from a substantially transparent material.

18. The method of claim 16, wherein installing the optical interface into the first portion of the cavity includes inserting a glass window into the first portion of the cavity.

19. The method of claim 16, further comprising applying an adhesive material in the second portion of the cavity.

20. The method of claim 19, wherein applying an adhesive material into the second portion of the cavity includes pouring epoxy into the cavity along the first surface of the second portion.

* * * * *